United States Patent [19]

Pellen

[11] 3,998,344
[45] Dec. 21, 1976

[54] BALE WAGONS
[75] Inventor: Josef Pellen, Mulgrave, Australia
[73] Assignee: Sperry Rand Corporation, New Holland, Pa.
[22] Filed: Mar. 28, 1973
[21] Appl. No.: 345,628
[30] Foreign Application Priority Data
   Apr. 4, 1972   Australia ........................ 8488/72
[52] U.S. Cl. .................... 214/520; 198/520; 214/83.26
[51] Int. Cl.² ....................................... B60P 1/36
[58] Field of Search ............. 214/83.26, 520, 521, 214/518, 522, 6 B, 77 R, 80; 198/128, 7 BL; 56/210, 212, 213, DIG. 15

[56] References Cited
UNITED STATES PATENTS

| | | | |
|---|---|---|---|
| 943,473 | 12/1909 | Schuman | 214/77 R |
| 1,175,296 | 3/1916 | Raymer | 214/77 R |
| 2,772,007 | 11/1956 | Johnson | 214/80 |
| 3,575,310 | 4/1971 | Albertson | 214/522 |
| 3,661,287 | 5/1972 | McCarty | 198/128 |
| 3,722,722 | 3/1973 | Blair | 198/7 BL |
| 3,724,168 | 4/1973 | Cassady, Jr. et al. | 214/522 |

FOREIGN PATENTS OR APPLICATIONS 1,318,514   1/1963   France ....................... 214/80

Primary Examiner—Robert J. Spar
Assistant Examiner—Donald W. Underwood
Attorney, Agent, or Firm—John R. Flanagan; Frank A. Seemar; Michael R. Swartz

[57] ABSTRACT

A mobile bale wagon has a pickup and throwing mechanism mounted on the forward end of the wagon and adapted to pick up bales lying on the ground and throw the bales into the wagon as the wagon moves in a forward direction. The pickup and throwing mechanism is mounted on the wagon end for pivotal movement about a generally horizontal axis which extends generally parallel to the direction of wagon movement. A hydraulic cylinder is provided to effect pivotal movement of the mechanism about the horizontal axis.

4 Claims, 6 Drawing Figures

BALE WAGONS

BACKGROUND OF THE INVENTION

1. Field of the Invention

This invention relates to an implement for handling the bales and more particularly to a bale wagon having a mechanism mounted on the front thereof to pick up bales from the ground as the wagon travels forwardly and to throw the bales rearwardly into the wagon.

It is known to provide bale wagons having mechanism for picking up bales from the ground and delivering them into the wagon and having mechanism to discharge loaded bales from the wagon.

The present invention is concerned with an improved mounting structure for the bale pickup means to the bale wagon, which improvement facilitates the handling of bales.

2. Description of the Prior Art

Implements of this type currently in use, employ a bale pickup and throwing mechanism which has a fixed orientation in respect of the bale wagon, and thus all bales are delivered to the wagon along the same flight path. This fixed orientation of the pickup and throwing mechanism has disadvantages under certain operating conditions such as on hilly terrain, or when winds are prevailing, as the bales may be thrown beyond the confines of the wagon.

More particularly it is pointed out that when the equpment is operating on a side hill with, for example, the right side of the equipment at a lower elevation than the left side, unless provision is made to the contrary, bales will be thrown towards the right wall of the wagon to build up in height to the top of the wagon and finally bales will spill over the side of the wagon.

Also when the wagon is travelling on level ground, the bale pickup and throwing mechanism which has a fixed orientation in respect of the bale wagon has a disadvantage as all the bales are delivered to the wagon along the same flight path and thus all the bales are piled up together at substantially the same location in the wagon whereby it is difficult to fully load the wagon.

Another disadvantage resides in the fact that with structures of the foregoing type it is not possible to vary the position of the lower pick up end in accordance with the location of the bale to be pick up relative to the line of travel of the wagon.

It is thereto the principal objective of the present invention to provide a bale handling implement including a wagon and a bale pick up and throwing mechanism, wherein the operator may vary the flight path of the bales in accordance with the operating conditions and desired bale distribution in the wagon, and vary the location of the lower end of the mechanism to align with bales lying on the ground.

A further objective of this invention is to provide improvement in or modification of the bale wagon claimed in U.S. Pat. No. 3,675,802.

SUMMARY OF THE INVENTION

Broadly the invention proivdes on a mobile bale wagon a bale pick up and throwing mechanism located and adapted to pick up bales lying on the ground and throw the bales into the wagon as the wagon travels forwardly, to pick up and throwing mechanism being mounted for pivotal movement about a horizontal axis extending parallel to the direction of movement of the wagon. Also, means is provided to effect pivotal movement of the pick up and throwing mechanism.

The pick up and throwing mechanism is mounted on the front of the wagon and located towards one side thereof. The mechanism is provided intermediate its height with a rearwardly projecting horizontal pin which is journalled in a bearing mounted on the front of the wagon. A hydraulic cylinder is connected between the front of the wagon and a lower portion of the mechanism so that operation of the cylinder will pivot the mechanism in the bearing.

The provision of means to pivot the pick up and throwing mechanism about a horizontal axis, enables the operator to vary the position of the discharge end of the throwing mechanism in relation to the wagon, and thus vary the flight path of the bales delivered from the throwing mechanism. In addition the pivotal movement of the pick-up and throwing mechanism may be used to vary the position of the lower pickup end in accordance with the location of the bale to be picked up relative to the line of travel of the wagon.

Other objects and advantages will appear from the following description of the preferred embodiment of the invention, when considered in connection with the accompanying drawings, and the novel features will be particularly pointed out in the appended claims.

For a detailed description of the implement to which the present invention is applied, reference is also made to the U.S. Pat. No. 3,675,802.

DESCRIPTION OF THE PREFERRED EMBODIMENT

Figure 4:
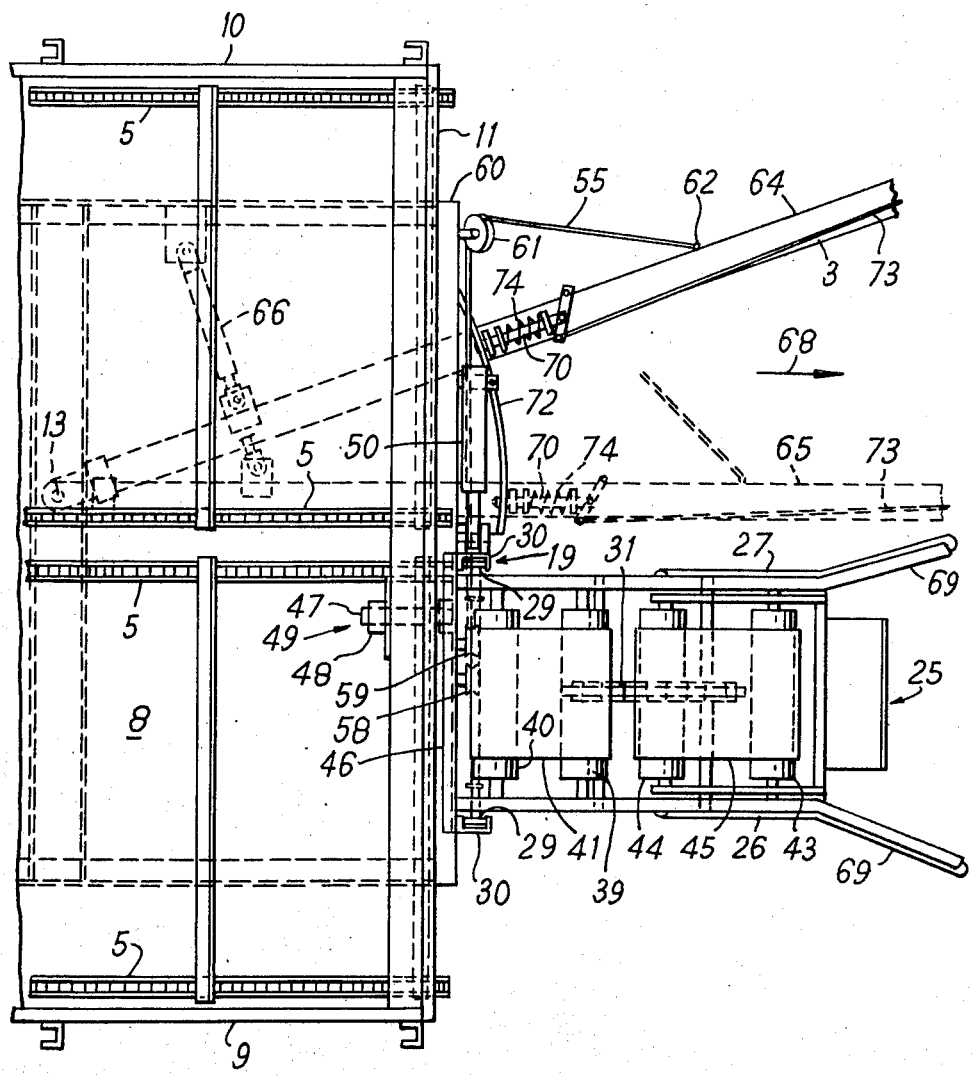
FIG. 4 is a plan view of FIG. 2

The equipment of the present invention comprises in general a bale loading and unloading wagon 1 having a load carrying body, a chassis 2, a wagon tongue 3, a bale pick up and bale thrower means, indicated as a whole by a reference FIG. 4, mounted at the front of the wagon, an apron conveyor 5 extending from the front to the rear of the wagon floor for moving bales rearwardly, a pivoted tail gate 6, a transverse conveyor 7 mounted on the tail gate 6 and generally conventional drive mechanisms for the bale pick up and bale thrower means 4, the apron conveyor 5 and the transverse conveyor 7. The wagon is hitched to a tractor or other propelling unit (not shown) having a P.T.O. by means of the tongue 3 in a usual manner and the drive mechanisms are connected to the P.T.O.

The bale wagon 1 has a floor 8, side walls 9 and 10, a front wall 11, the chassis 2, ground wheels 12, the tongue 3 pivotally connected to the chassis at 13, the tail gate 6, suitable framework including upright braces 14 and cross braces 15 resting on the chassis 2. The rear tail gate 6 is pivotally carried by the wagon by brackets 17 and pivot pins 18 and is adapted to be firmly latched in its upright position.

Figure 1:
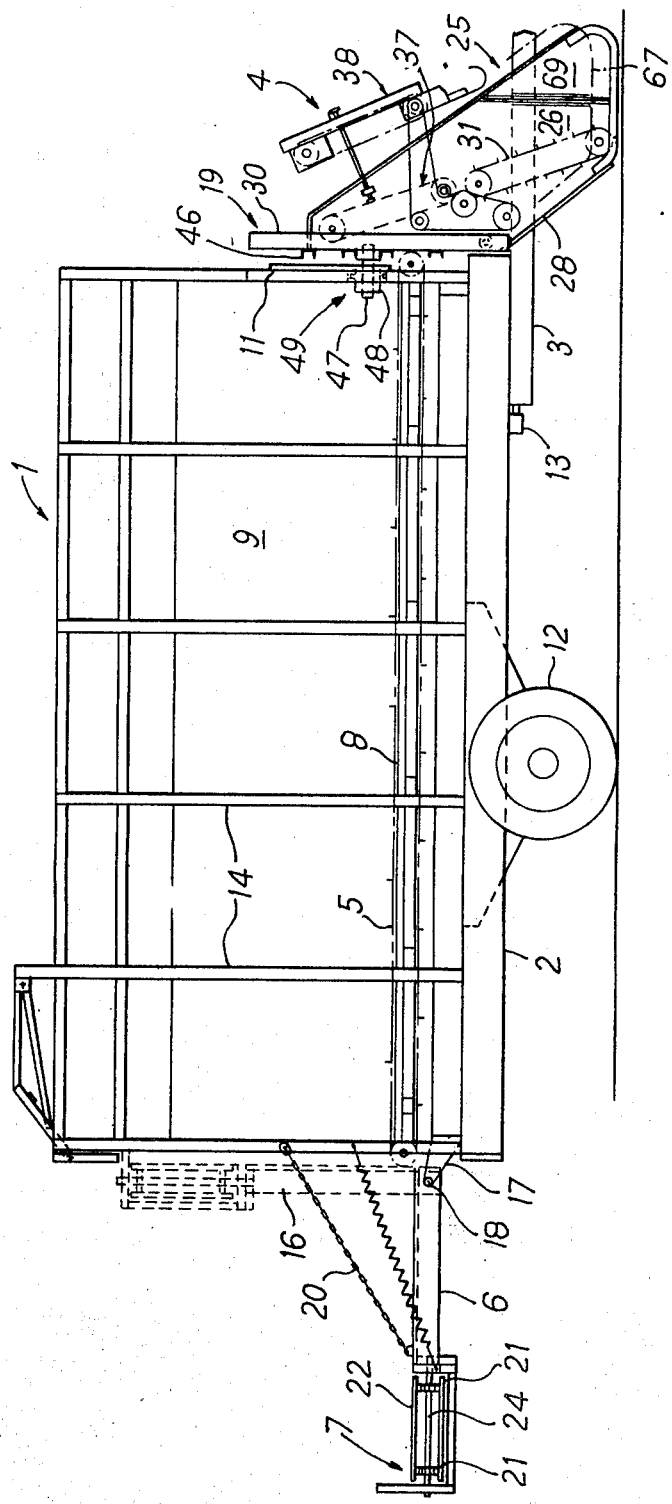
FIG. 1 is a more or less diagrammatic side elevation of a bale wagon constructed in accordance with the invention.

When the wagon is being loaded with bales and when it is in transport from place to place the end gate 6 is latched in closed position as shown in broken lines at 16 in FIG. 1. When bales are to be unloaded from the wagon the latch device is released to lower the gate from the closed position to a convenient bale unloading position. The tail gate is held in adjusted position by support chains 20. The transverse conveyor 7 of the tail gate 6 comprises a pair of apron chains 21, carrying longitudinally spaced apron slats 22 and sprockets mounted on shafts 24 for mounting the apron chains 21 thereon.

The bale pick up and thrower means 4 is in the form of a vertically movable unit 25 mounted at the front of the wagon and having side plates 26 and 27, suitable cross braces including a bottom cross plate 28 and vertically spaced side rollers 29 carried by the side plates adapted to ride in upright tracks formed by a pair of upright rugged channel members 30 of a carrier frame 19.

Located centrally of the lower portion of the unit is a bale pick up device in the form of an upright rearwardly inclined chain 31 having spaced bale engaging lugs 32 running over sprockets 33 and 34 screwed on shafts 35 and 36 having suitable bearings in the side plates.

Located above the pick up device and also carried by the unit 25 is a bale throwing device comprising a pair of coextensive conveyors 37 and 38 spaced apart and operable to engage opposite sides of bales fed there by the pick up device and to traject the bales into the wagon.

The lower conveyor 37 comprises lower and upper rollers 39 and 40 journalled in the side plates 26 and 27 of the unit, around which an endless belt 41 extends. The upper conveyor 38 comprises a frame 42 and lower and upper rollers 43 and 44 journalled in the frame 42 around which an endless belt 45 extends.

The carrier frame 19 having two horizontally spaced substantially vertical tracks 30 in also provided with horizontally extending cross beams 46 extending between the vertical tracks 30. The carrier frame is provided intermediate its height with a rearwardly projecting horizontal pin 47 which is journalled in a bearing 48 mounted at 49 on the front end of the wagon. The horizontal pin 47 is arranged substantially away from the middle of the width of the carrier frame 19 and preferably towards the side of the carrier frame facing the middle of the wagon. By this arrangement the gravity forces tend to pivot the carrier frame towards an inclined position having the lower end positioned closer to the middle of the wagon than the upper end. A single acting hydraulic cylinder 50 is connected between the cross beam 60 of the chassis 2 and the front end of the wagon and a lower portion of the carrier frame 19, so that operation of the cylinder 50 will pivot the carrier frame 19 in the bearing 48 in the opposite direction and opposite to the gravity forces.

Reverting now to the unit 25 herein before described it will be seen that the unit is suspended by a cable system 54 comprising a cable 55 secured at 56 to the shaft 57 of the lower carriage rollers 29 and leading upwardly and around an upper pulley 58 mounted on plate 23 of the carrier frame 19 and then downwardly and around a second lower pulley 59 mounted on the cross beam 60 of the chassis 2 and finally leading horizontally around a third pulley 61 located at the opposite side of the wagon tongue 3 for connection at 62 to the wagon tongue 3.

A pair of vertically disposed springs 63 anchored at their upper ends to a cross beam 46 of the carrier frame 19 and at their lower ends to the carriage roller shaft 57 are provided.

These springs exert an upward pull on the carriage and counteract some of the weight of the carriage. When the carriage moves from raised to lowered position the weight of the carriage overcomes the action of the springs and the springs become tensioned so that the carriage is yieldingly suspended.

In this connection it is pointed out that without provision to the contrary, if very rough ground or an obstacle on the ground were encountered by the carriage, binding of or damage to the carriage could result. The yielding suspension of the carriage just described advantageously enables the carriage to yield upwardly under such conditions thus avoiding objectionable consequences.

When the equipment is conditioned for load transport or road travel the wagon tongue 3 is swung to its central position, indicated in broken lines at 65 by means of a single acting hydraulic cylinder 66 and the wagon tongue is hitched to the tractor drawbar thus positioning the tractor and wagon in line.

For bringing the wagon in its operative position for loading bales laying on the ground, the tractor may be maneuvered in such a manner with respect to the bale wagon so as to pivot the wagon tongue 3 at 13 towards a position which is inclined to the longitudinal axis of the wagon. To assist thereto the wheel 12 which is positioned behind the pick up and bale thrower means 4 may be braked to ensure that the wagon tongue 3 is pivoted relative to the wagon. A spring loaded latch pin 70 is provided on the wagon tongue 3 and is arranged to cooperate with latching holes provided in a fixed extension 72 supported on the wagon structure. The pin 70 may be actuated to be released from its latching position by means of a rope or pull rod 73 which extends towards the operator's location on the towing tractor. The spring 74 is operative to urge the latch pin 70, towards its latching position.

In the position of the wagon for load transport or road travel it is necessary that the unit 25 be raised to a height such as indicated in broken lines at 67 in FIG. 1 in order to provide ample ground clearance during transport and road travel. To the automatic accomplishment of this end the wagon tongue 3 is adapted when in its central position 65 to pull on the cable 55 of the unit lift system 54 and thereby raise the unit to its desired ground clearance position.

Figure 2:
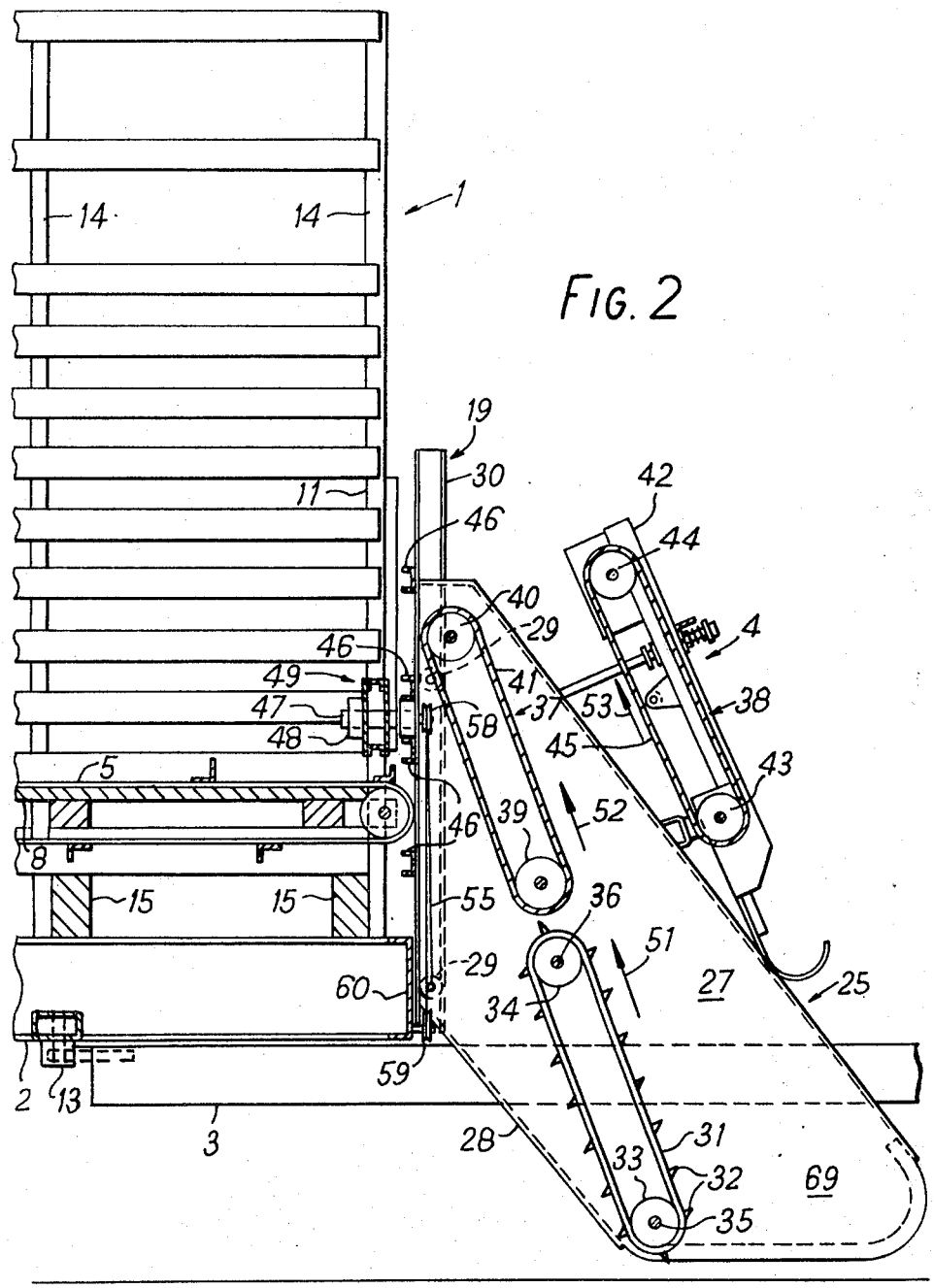
FIG. 2 is a somewhat enlarged sectional view of the front portion of the wagon with bale pick up and bale thrower mechanism.

When the equipment is employed for bale loading the propelling tractor travels in a path to one side of the path of the bale wagon, i.e. to the left side of the front of the wagon in the direction of travel indicated by the arrow 68. In this position the wagon tongue 3 is swung to the angular position as shown at 64 in FIGS. 3 and 4 and the pull on the cable 55 of the unit lift system 54 is released to automatically lower the unit 25 by gravity to its bale loading position with the bottom of the unit relatively close to the ground level, it being noted that the unit is shown in this position in FIGS. 1, 2 and 3.

Figure 5:
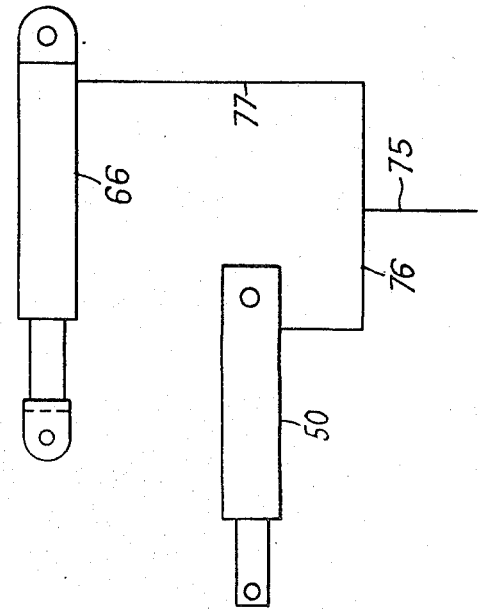
FIG. 5 is a diagrammatic view of the hydraulic circuitry.

FIG. 5 diagrammatically shows the hydraulic circuitry for controlling the angular displacement of the carrier frame 19 and the wagon tongue 3. The single acting cylinder 50 for controlling the position of the carrier frame 19 and the single acting cylinder 66 for controlling the position of the wagon tongue are both connected with a common pressure line 75 by means of tubes 76-77. The pressure line 75 is arranged to be coupled to the hydraulic system of the pulling tractor.

OPERATION

Figure 3:
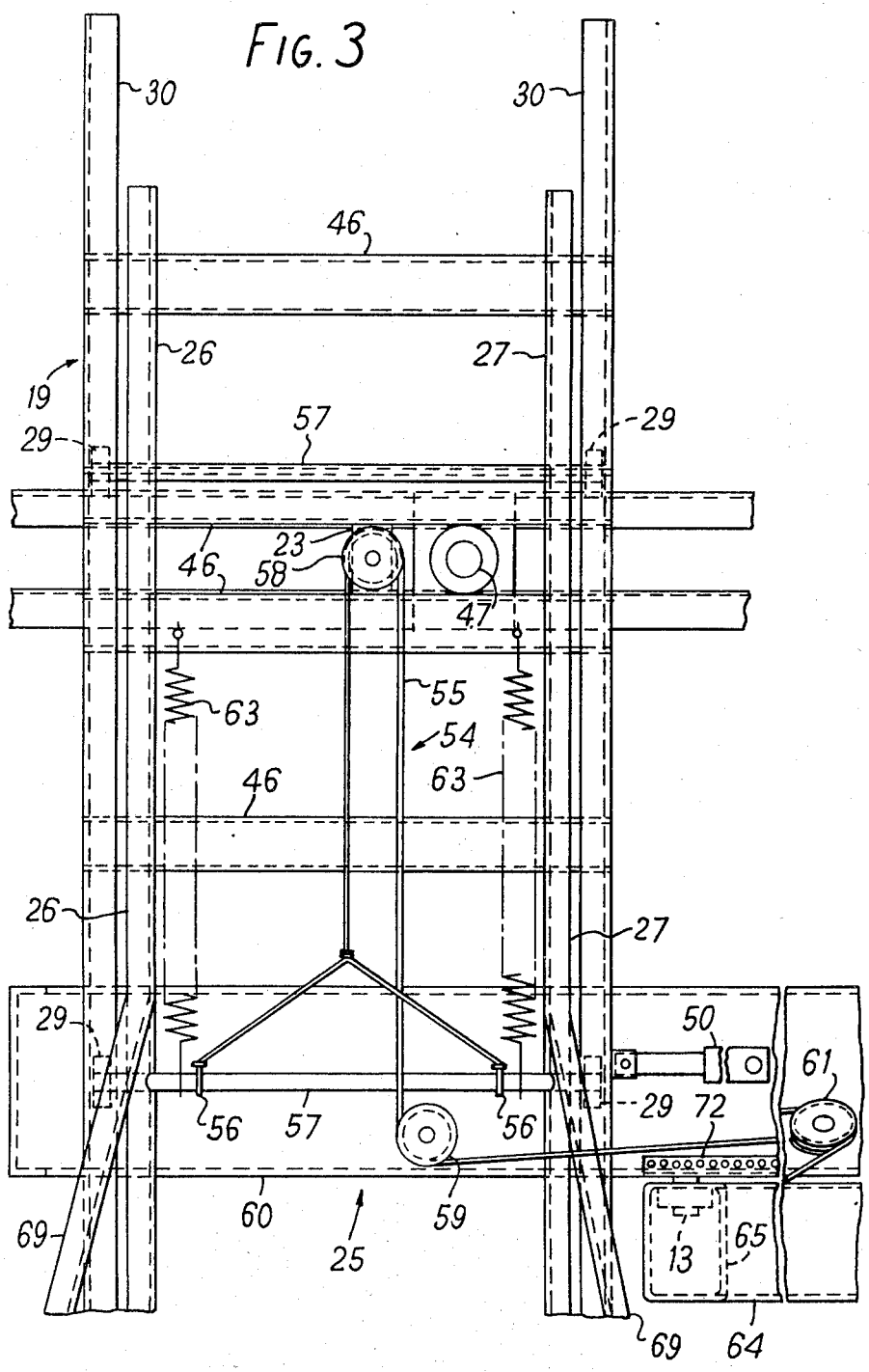
FIG. 3 is an enlarged fragmentary front view of the bale wagon with the carrier frame and the pick up and bale thrower frame but without the pick up and bale thrower unit.

When the equipment is in position for load transport or road travel and thus the wagon is in line with the towing tractor and when the equipment should be placed in position for bale loading operation, the operator pulls on the rope or pull rod 73 to release the latch pin 70 and further maneuveres the tractor in such a manner as to pivot the wagon tongue 3 to its angular position 64 as shown in FIGS. 3 and 4. In this position the operator releases the pull on the rope or pull rod 73 for latching the wagon tongue in its angular position whereby the wagon is arranged to travel in a path to one side of the path of the tractor. By swinging the wagon tongue to the angular position the pick up and bale thrower unit 25 is lowered to its bale loading position with the bottom of the unit 25 relatively close to the ground. As the wagon is propelled in forward direction bales are scooped from the ground by the flaired portion 69 of the side plates 26 and 27 of the unit 25 and are then raised by the pick up chain to and between the upwardly moving reaches of the belt of the bale thrower conveyor 37 and 38 and there trajected over the front wall of the wagon to the wagon floor. Therefore the pick up chain 31 and the bale thrower conveyor belts 41 and 42 are driven as indicated by arrows 51, 52 and 53. The thrower conveyor belts are driven at a comparatively high speed of the order of 200 to 300 meter per minute, so that the bales are delivered therefrom at a high speed and at a trajectory to travel rearwardly into the wagon. The rollers 39-40 supporting the rearmost thrower belt 41 are rigidly mounted in the carriage side walls 26-27 while the forward thrower belt 45 is mounted on a frame 42 which is pivoted near its lower end to the main frame of the unit and is resiliently supported at another spaced location so as to be urged towards the rear thrower belt 41 but to permit limited movement relative thereto to accommodate variation in the size of the bales.

During loading operation, the wagon tongue 3 remains latched in its angular position whereby the single acting hydraulic cylinder 66 has an invariable length. Upon actuation of the hydraulic system, hydraulic pressure is supplied to the pressure line 75 or released therefrom whereby, as the hydraulic cylinder 66 has an invariable length, the plunger of the cylinder 50 is extended, respectively retracted under the influence of the gravity forces acting on the pick up and bale thrower unit 25. Thereby the carrier frame 19 and the pick up and bale thrower unit 25 are pivoted in the bearing 48 in the one or the other direction and thus the flight path of the bales into the wagon is varied. This results in an even distribution of the bales in the wagon and enables to load the wagon completely.

When the equipment is operating on a side hill, it is possible to pivot the carrier frame 19 in the bearing 48 in such a manner as to position the bale thrower unit 25 to throw the bales towards the uphill side of the wagon whereby the build up in height to the top of the wagon and finally the spilling of bales over the side of the wagon is prevented.

The present invention also enables to eliminate the disturbing influence on the operation by strong side winds, which provided no provisions are made could deflect the flight path of the bales such that these bales might arrive over the sides of the wagon.

With the structure of the present invention it is also possible to vary the position of the lower pick up end in accordance with the location of the bale to be picked up relative to the line of travel of the wagon.

When the wagon is fully loaded the wagon may be transported to a bale storage place. Therefore the wagon tongue 3 should be pivoted to the central position where it is latched again. Thereby the pick up and bale thrower unit is raised and the wagon is placed in position for load transport and road travel.

At the point of bale delivery, the tail gate 6 is lowered and the apron conveyor 5 and the tranverse conveyor 7 are started in operation to unload the bales.

MODIFICATIONS

Other features and advantages of the present invention will occur to those skilled in the art, as will many modifications and alterations in the preferred embodiment of the invention described herein, all of which may be achieved without departure from the spirit and scope of the invention.

Figure 6:
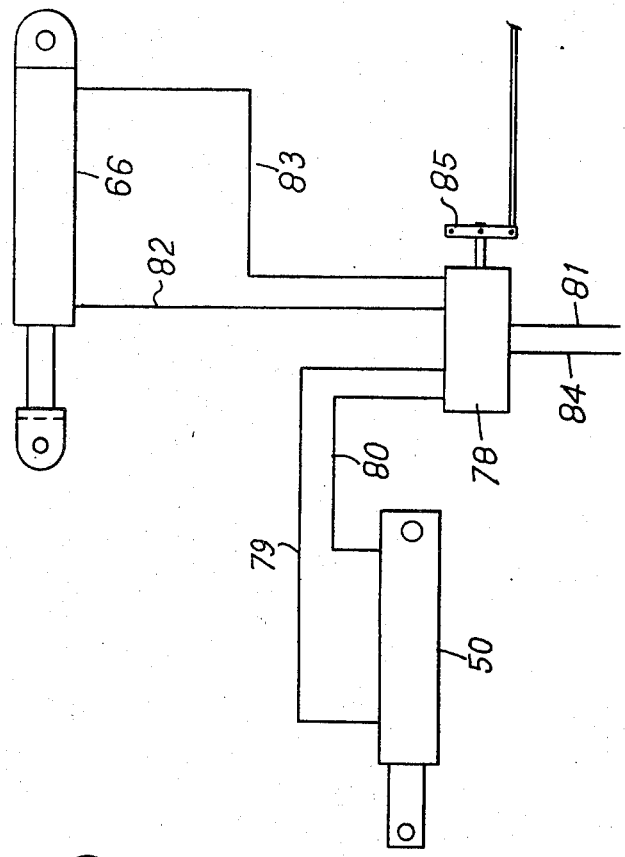
FIG. 6 is a diagrammatic view of another embodiment of the hydraulic circuitry.

It will for instance be understood that the same good results may be obtained with a hydraulic system as shown in FIG. 6, wherein both hydraulic cylinders 50 and 66 are of the double acting type and whereby a suitable control valve 78 and hydraulic power lines 79-80 and 82-83 and pressure and return lines 81-84 are provided; the lines 81 and 84 being arranged for connecting to the hydraulic system of the tractor and the control valve 78 having a suitable control handle 85 which may be actuated from the operator's location on the pulling tractor.

In FIG. 3 the pivot pin 47 and the upper pulley 58 are arranged at spaced relationship with respect to each other. In order to prevent that the pick up and bale thrower unit would be raised or lowered due to the pivotal movement of the carrier frame 19, the upper pulley 58 and the pivot pin 47 may be arranged coaxially.

Also it will be understood that the hydraulic cylinder 66 for controlling the position of the wagon tongue 3 may be removed. In this case the pivoting of the wagon tongue should be controlled by maneuvering the towing tractor with respect to the wagon.

What is claimed is:
1. A bale handling implement, comprising:
    a mobile bale wagon being moveable in a forward direction of travel across a field and capable of supporting a load of bales;
    a bale pick up and throwing means for picking up bales lying on the field forwardly of said wagon and throwing the bales along a rearwardly-directed flight path into said wagon as said wagon travels forwardly over the field;
    means for mounting said bale pick up and throwing means to the forward end of said wagon for pivotal movement relative to said wagon about a generally horizontal axis extending generally parallel to the direction of forward travel of said wagon across the field; and
    control means to effect pivotal movement of said bale pick up and throwing means relative to said wagon in order to vary the flight path of the bales being delivered to the wagon by said bale pick up and throwing means and thereby provide even lateral distribution of bales in said wagon.

2. A bale handling implement as set forth in claim 1, wherein said mounting means comprises:
   bearing means mounted to one of said wagon and said pick up and throwing means;
   means projecting outwardly from the other of said wagon and said bale pick up and throwing means and being journalled in said bearing means for pivotal movement of said bale pick up and throwing means about said generally horizontal axis extending generally parallel to said forward direction of wagon travel.

3. A bale handling implement as set forth in claim 2, wherein:
   said bearing means is mounted on the front of said wagon;
   said projecting means being journalled in said bearing means is mounted intermediately along the height of said pick up and throwing means and projects rearwardly therefrom; and
   said control means comprises a hydraulic cylinder coupled with, and extending between, said wagon and the lower end of said pick up and throwing means to effect said pivotal movement of said bale pick up and throwing means relative to said wagon.

4. A bale handling implement as set forth in claim 1, wherein said control means comprises:
   a hydraulic cylinder extending between said bale pick up and throwing means and said wagon to effect said pivotal movement of said bale pick up and throwing means relative to said wagon.

* * * * *